E. A. BEARDSLEY.

Improvement in Composition for Stove-Cover Lifters.

No. 126,512.          Patented May 7, 1872.

Emilie A. Beardsley

Witnesses.
Fred Haymer
Benj. F. Sharp.

UNITED STATES PATENT OFFICE.

EMILIE A. BEARDSLEY, OF BINGHAMTON, NEW YORK, ASSIGNOR OF ONE-HALF OF HER RIGHT TO EDWIN M. HAYNES, OF SAME PLACE.

IMPROVEMENT IN COMPOSITION-HANDLES FOR STOVE-COVER LIFTERS.

Specification forming part of Letters Patent No. 126,512, dated May 7, 1872; antedated April 26, 1872.

*To all whom it may concern:*

Be it known that I, EMILIE A. BEARDSLEY, of Binghamton, in the county of Broome and State of New York, have invented a new and Improved Handle for Stove-Cover Lifters, Griddle-Lifters, &c.; and I do hereby declare that the following is a full, clear, and exact description thereof, reference being had to the accompanying drawing forming a part of this specification.

This invention consists of a handle composed of a shell of sheet metal and a filling of plaster of Paris, or other material of similar nature, which is introduced in a plastic state, and which serves both to secure the lifter in its handle and as a poor conductor of heat. The handle thus produced is very durable, not being liable to be burnt or charred like a wooden one, and, besides this, is not liable to become so highly heated as to make it difficult to handle.

Figure 1:
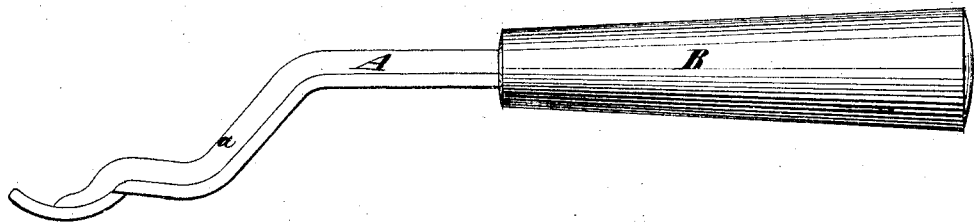
Figure 2:
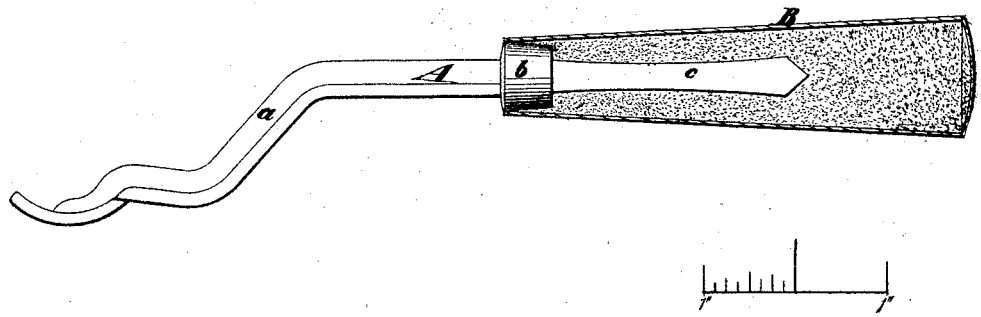

In the accompanying drawing, Figure 1 is a side view of a lifter with my improved handle, and Fig. 2 is a similar view of the lifter with the handle in section, showing the manner of securing the handle to the lifter.

Similar letters of reference indicate corresponding parts in both figures.

A is the lifter, the projecting portion of which is of the usual bent form, strengthened by a central rib, $a$, and the portion of which fitting the mouth of the shell B is formed with a boss or collar, $b$, projecting from which is the stem or tang $c$. This stem or tang is made smaller at the middle than it is near the collar $b$ or at the extremity, and is thereby the more securely kept in place. The shell B is made of zinc or other sheet metal formed into a tube. To complete the handle and secure it to the lifter the tube is first filled with plaster of Paris, or other analogous material, C, in a plastic state; the tang $c$ and collar $b$ of the lifter are then inserted, and the said plastic material allowed to settle around them, and thereby forming the means by which they are secured together, and also, by reason of its being a non-conductor of heat, keeping the handle cool during the use of the lifter.

What I claim as my invention, and desire to secure by Letters Patent, is—

The lifter provided with a boss, $b$, and stem or tang $c$, formed as shown and described, in combination with the shell B and plastic non-conducting filling C, substantially as specified.

EMILIE A. BEARDSLEY.

Witnesses:
 FRED HAYNES,
 R. E. RABEAU.